(No Model.)
N. T. PEDDYCORD.
HOE.
No. 506,336. Patented Oct. 10, 1893.
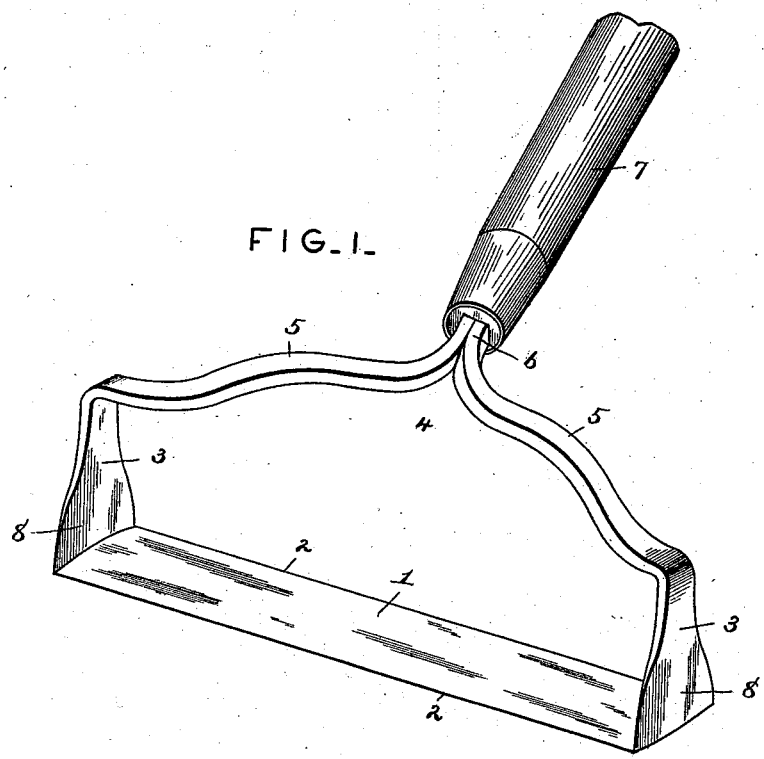
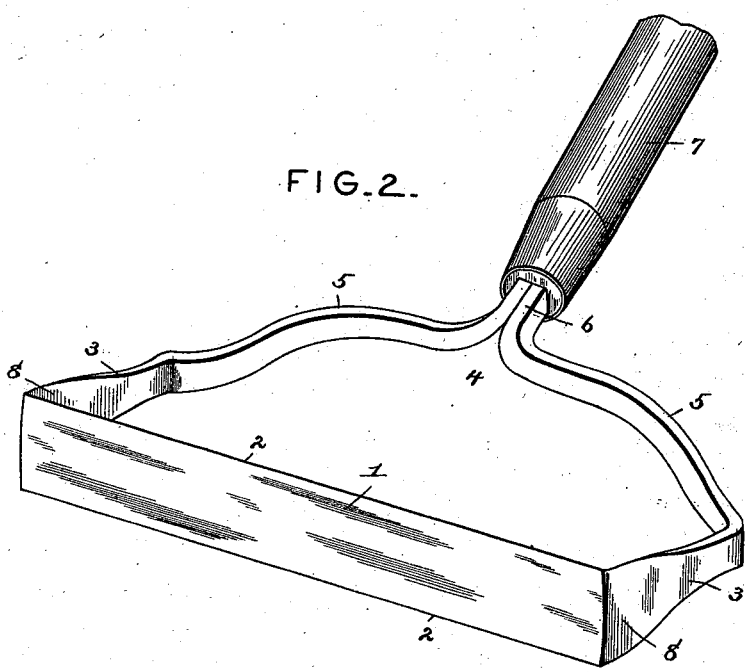
Witnesses
Harry L. Ames
H. J. Riley
Inventor
Nathan T. Peddycord
By his Attorneys,
C. A. Snow & Co.

UNITED STATES PATENT OFFICE.

NATHAN T. PEDDYCORD, OF WILSEY, KANSAS.

HOE.

SPECIFICATION forming part of Letters Patent No. 506,336, dated October 10, 1893.

Application filed August 20, 1892. Serial No. 443,618. (No model.)

*To all whom it may concern:*

Be it known that I, NATHAN T. PEDDYCORD, a citizen of the United States, residing at Wilsey, in the county of Morris and State of Kansas, have invented a new and useful Hoe, of which the following is a specification.

The invention relates to improvements in hoes.

The object of the present invention is to provide a simple and inexpensive hoe adapted for rapid weeding in which the hoe blade will be arranged flat upon the ground, and capable of being reversed to bring the blade into a vertical position for hilling.

The invention consists in the construction and novel combination and arrangement of parts hereinafter fully described, illustrated in the accompanying drawings, and pointed out in the claims hereto appended.

In the drawings—Figure 1 is a perspective view of a hoe constructed in accordance with this invention, the blade being arranged in a horizontal position for weeding. Fig. 2 is a similar view the blade being arranged in a vertical position for hilling.

Like numerals of reference indicate corresponding parts in both figures of the drawings.

1 designates a straight flat hoe blade having both its longitudinal edges 2 sharpened for cutting weeds whereby when the hoe blade is arranged in a horizontal position as illustrated in Fig. 1 of the accompanying drawings, it will cut in moving both backward and forward. The hoe blade is connected by straight integral arms 3 with a fork 4 which consists of the curved divergent arms 5 and a shank 6 inserted in a handle 7 in the usual manner. The straight arms 3 have their lower portions 8 enlarged and of the same width of the blade 1, and sharpened at opposite edges to facilitate the operation of the hoe, and these straight arms are arranged perpendicular to the hoe blade and are in a vertical position when the hoe is used for weeding and in a horizontal position when the hoe is used for hilling. The divergent arms of the fork incline upward and rearward from the straight arms, and by this disposition of parts the blade of the hoe may be arranged in either a horizontal or vertical position by simply turning the hoe handle and reversing the hoe.

The hoe is simple, strong and durable, and adapted for weeding and hilling, and it pulverizes the ground and leaves a dry soil on top.

It will be apparent that the hoe may be reversed to bring its blade either into a horizontal position for weeding, or into a vertical position for hilling without altering the position of the handle so that the hoe may be held in the same position by the person using it with the blade in either of the said positions. It will be observed that the edges 2 of the blade are parallel, and that the arms 5 of the fork join with the arms 3 in a right angular bend, and that the shank 6, formed by the two meeting ends of the material from which the hoe is made, is set at an acute angle to the blade, whereby in making the adjustment from a weeding hoe to a hilling hoe, it is only necessary to turn the hoe over and no adjustment of any character is required. This construction is considerable of an advantage over prior constructions which necessitated adjustments to bring the parts in different positions, and my invention is to be distinguished from such devices in that respect, since no adjustment is necessary to change the hoe so as to adapt it for either hilling or weeding. This is quite an important point, since farmers and others who have use for such a tool would dislike very much to spend their time loosening nuts and adjusting bolts for the purpose of changing the tool from one device to another.

The advantages of an implement possessing all the necessary elements of adjustability without having to go through the performance of adjusting the parts would certainly be appreciated by farmers, and it is on this feature, together with the fact that the hoe is made of a single piece, that I lay particular stress.

What I claim is—

A weeding and hilling hoe comprising a straight flat blade 1 having parallel edges 2, arms 3 integral with the blade, the lower portions 8 of the arms being enlarged and of the same width as the blade and sharpened at opposite edges to facilitate the operation of the hoe, said arms being arranged perpendicular to the blade and joining with the fork 4 which consists of curved divergent arms 5, and the shank 6 made up of the two meeting ends of the single piece of material from which the hoe blade, arms, and fork are made, the divergent arms of the fork joining with the straight arms 3 in a right angular bend, and the shank 6 being set at an acute angle to the blade whereby the hoe is made reversible and is adapted to be turned to bring the blade in a horizontal position for weeding and into a vertical position for hilling and without the necessity of changing the adjustment of the handle, but by a reversal of the tool, all substantially as herein described.

In testimony that I claim the foregoing as my own I have hereto affixed my signature in the presence of two witnesses.

NATHAN T. PEDDYCORD.

Witnesses:
GEORGE W. COFFIN,
M. J. KIMMEL.